United States Patent Office 2,899,319
Patented Aug. 11, 1959

2,899,319

DEHYDRATION OF CHERRIES

Myron John Powers, Lafayette, and Norma Jean Downes, Albany, Calif., assignors to the United States of America as represented by the Secretary of Agriculture No Drawing. Application August 30, 1957
Serial No. 681,419

2 Claims. (Cl. 99—204)

(Granted under Title 35, U.S. Code (1952), sec. 266)

A non-exclusive, irrevocable, royalty-free license in the invention herein described, for all governmental purposes throughout the world, with the power to grant sublicenses for such purposes, is hereby granted to the Government of the United States of America.

This invention relates to improvements in processes for the production of dehydrated cherries.

The process of the invention yields dehydrated cherries of markedly superior properties over those prepared by known methods. In particular, the products prepared as herein described include these significant advantages—

(1) When rehydrated they form reconstituted cherries which can hardly be distinguished from the natural fruit in color, taste, and texture.

(2) They have a porous texture so that they can be rehydrated readily. Thus when contacted with an edible liquid such as water, sugar solutions, etc., the liquid can readily penetrate into the tissue quickly forming a plump fruit of virtually natural texture.

(3) The products are extremely stable on storage. If stored at room temperature they will retain their original qualities indefinitely. Even if stored at 100° F., as representing accelerated storage conditions, there is no significant change in color or flavor or texture after 6 months.

In accordance with the invention the cherries are sulphited, frozen, dehydrated under vacuum, and packaged, all as described in greater detail below.

The fresh fruit is washed and preferably pitted before further treatment. The pitted cherries are then sulphited, that is, they are dipped in an aqueous bath containing sulphur dioxide, sodium sulphite, sodium bisulphite, sodium metabisulphite, or mixture thereof. In general the bath should have an $SO_2$ concentration of about 0.1 to 1.0%. Optimum results are usually obtained when the dipping treatment gives the fruit an $SO_2$ content of about 400 p.p.m. Where the sulphur dioxide is supplied as an alkali metal sulphite, bisulphite or metabisulphite, it is preferred to acidify the bath to a pH of about 3–3.5 by addition of citric, tartaric, or other fruit acid.

The sulphited fruit is then individually quick frozen by which is meant that the fruit is frozen in such a way as to produce discrete frozen cherries, as distinguished from freezing systems which produce an agglomerated mass of frozen fruit. The desired results can readily be attained by spreading the cherries on a perforated tray, in a layer one cherry deep, and subjecting them to a blast of air at below-freezing temperature—usually about zero to minus 20° F. Other techniques well known in the freezing art for preparing discrete frozen particles can of course be employed.

The manner of freezing described above has great advantage in the subsequent dehydration step. For one thing, the frozen units can be readily fed to the dehydration equipment without requiring breaking up of large masses as where an agglomerated frozen product is involved. Another important point is that the dehydration can be accomplished more effectively because the surface of each individual piece is exposed to the dehydrating atmosphere. As a net result vaporization of moisture occurs at a rapid rate and each piece is dehydrated to the same extent. Such action cannot take place in the case of dehydrating an agglomerated frozen mass. In such event dehydration is at a maximum at the surface of the mass and pieces within the mass retain larger proportions of moisture simply because they are not exposed to the same conditions of vacuum and temperature as the outer portions.

A most important advantage of this freezing step is that it protects the cherries from certain deleterious changes during the subsequent dehydration step. As explained hereinbelow the dehydration is applied to the cherries in the frozen state. This has the effect that juice is prevented from draining from the fruit and also the original volume of the fruit is retained. The net result is that the dried product contains all the natural content of the fruit (except of course water) and the dried product is in a porous, hence easily rehydratable, condition. Were the pitted cherries to be applied to the dehydration in an unfrozen state these desirable results would not be assured. Thus juice would ooze out of the fruit so that the final product would represent only part of the original fruit, valuable ingredients such as sugar, flavoring and coloring components being thus lost. It has been experimentally determined that if pitted frozen cherries are allowed to thaw, they will exude an amount of juice equal to 30 to 40% of the original weight of the fruit. It is thus evident that in the process of the invention the freezing step cooperates with the subsequent dehydration step whereby to prevent loss of juice and shrinkage during the dehydration.

It is to be noted that the frozen cherries need not be dehydrated immediately but can be stored in the frozen state as long as desired before dehydration. This is of course a great advantage to the food processor since the fruit need not necessarily be dehydrated at the time of harvest but at any time subsequent thereto so that the operations of the factory can be at an even pace throughout the year rather than being concentrated at harvest time.

When it is desired to further process the fruit, the cherries still in their frozen state are subjected to vacuum dehydration. In conducting this operation various types of apparatus suited for batchwise or continuous operation and provided with means for producing a vacuum and means for supplying heat to the material under treatment may be used. For illustrative purposes, the following description explains the procedure when using a batch-type vacuum shelf drier.

Trays containing the frozen cherries are introduced into a vacuum drier equipped with hollow shelves through which a heating medium may be circulated. In loading the trays it is preferred to spread out the fruit in a layer one cherry deep to assure maximum contact between the atmosphere within the drier and the surfaces of the fruit and to ensure application of heat to the fruit. After the trays are loaded into the drier, the drier is closed and the vacuum applied, the vacuum being maintained until dehydration is completed. Usually a pressure of about 0.1 to 10 mm. of Hg, preferably below 3 mm., is used. Vacuums within this range are easy to maintain with relatively inexpensive equipment such as steam ejectors. A heating medium such as hot water or steam is circulated through the hollow shelves to supply heat to the fruit and thus force the removal of moisture therefrom at a rapid rate so that the entire dehydration will be completed in a practicable interval of time. The temperature at which the drier shelves (or other heating means) is maintained depends on many factors including the initial temperature of the fruit, the degree of vacuum employed, the heat transfer characteristics of the drier and the rate at which heat can be transferred from the heating medium to the fruit. In any event such an amount of heat is supplied that the fruit remains in the frozen condition only until it assumes a liquid-retentive, volume-stable condition. Thereafter the fruit is maintained at a temperature above its freezing point but not higher than about 150° F. until the dehydration is completed thus to force the removal of moisture at a rapid rate. This situation is further explained as follows. In the initial stage of dehydration it is desirable to maintain the fruit in a frozen state whereby to prevent exudation of liquid from the fruit and to maintain the fruit in its original volume. However as moisture is eliminated from the fruit it passes into the liquid-retentive, volume-stable condition mentioned above by which is meant that the fruit is in such state that it will not exude liquid and will not shrink in volume at above-freezing temperatures. This condition is reached when the moisture content of the fruit is reduced to the level of about 50 to 60%. When this condition obtains the fruit need no longer be held frozen but is raised to higher temperatures thus to obtain rapid evaporation. A significant advantage of the mode of dehydration in accordance with the invention is that sublimation (ice to vapor), a very slow process of moisture removal, is employed for only an initial phase of the dehydration whereas evaporation (liquid to vapor), a very rapid process of moisture removal is relied on for most of the moisture removal. In many cases the desirable results outlined above are achieved by maintaining the drier shelves at about 140–150° F. throughout dehydration. The intense evaporative cooling effect during the first part of the dehydration will keep the fruit frozen whereas as the dehydration continues the temperature of the fruit will rise to equal the temperature of the shelves. A more rapid elimination of moisture can be attained by maintaining the shelves at a higher temperature, for example, 150–212° F. during the initial part of the dehydration and when the temperature of the fruit reaches about 140° F. to 150° F., reducing the shelf temperature to about 140–150° F. whereby the temperature of the fruit is maintained at about 140–150° F. during the second stage of the dehydration. By using this two-stage temperature control the total time for dehydration can be nearly halved without any damage to the quality of the fruit. It is to be noted that even though a high temperature is applied during the initial stage of the dehydration, the fruit remains frozen for a time because of the cooling effect of the rapid evaporation. In any event the dehydration is continued until the cherries have a moisture content of less than 5%. When a product of maximum stability is desired, the moisture content is reduced to 1% or less.

When the cherries have been dehydrated to the desired moisture level, they are either directly removed from the drier or first cooled therein to about room temperature (70° F.) by circulating cold water through the hollow shelves of the drier. If the cherries are removed from the drier while still warm (about 140–150° F.) they have plastic properties so that about twice the weight of the warm cherries can be packed into a container as compared to those which are first cooled to room temperature. Such packing may be advantageous to save on container and storage costs. Moreover, no damage is done to the cherries by compressing them in this manner. In any event, the dehydrated cherries are packaged in a sealed container in a non-oxygeneous atmosphere, that is the atmosphere within the container is essentially free from oxygen. Such technique of packaging involves sealing the products under vacuum or in an inert non-toxic gas such as nitrogen or carbon dioxide.

In connection with the dehydration procedure described above, various other expedients may be applied to further increase the drying rate. One plan is to place the frozen cherries directly on the heated shelves of the drier instead of on trays. In this way better heat transfer is obtained. Another system is to use thick aluminum trays to hold the fruit instead of the usual thin stainless steel trays whereby to obtain better heat transfer. Another plan is to paint the hollow shelves of the drier, or portions of them, black in order to enhance transmittance of radiant heat from the heated shelves to the fruit.

The invention is further demonstrated by the following illustrative example:

A batch of fresh Montmorency cherries were washed and pitted. The pitted cherries were then given a 1-minute dip in an aqueous solution containing 1% $SO_2$ (added as sodium metabisulphite) and 2% citric acid. The sulphited ($SO_2$ content 500 p.p.m.) cherries were then individually frozen by spreading them on a wire screen and exposing them to a blast of air at about minus 20° F.

The frozen cherries were then loaded onto stainless steel trays at a loading of 2 lbs. per square foot and the trays were slid onto the shelves of a vacuum drier. The drier was closed and the interior thereof was evacuated—a vacuum equivalent to a pressure of 1 mm. Hg was maintained throughout the process. The shelves of the drier were brought to 140° F. and held at this temperature throughout the dehydration. After 16 hours the moisture content of the cherries was 0.4% by the Karl Fischer method. The dehydrated cherries were then removed and packaged in cans under vacuum. It was observed that the products had a porous texture so that they could be readily rehydrated to form fruit of good color, taste, and texture.

To test their stability, samples of the packaged dehydrated cherries were stored for 24 weeks at 100° F. After this period of storage the products were still red in color and gave a reading of 22 for redness on the "a" scale of the Hunter colorimeter as against a reading of 24 for the products immediately after dehydration. By contrast conventional canned cherries gave an original reading of 22 on the same scale and a reading of 12 after 24 weeks' storage at 100° F., indicating a definite brown color after the storage period.

Having thus described the invention, what is claimed is:

1. A process for preparing dehydrated cherries which comprises sulphiting pitted cherries, freezing the sulphited cherries to produce individual, discrete frozen cherries, subjecting the resulting material in the form of individual, discrete, frozen cherries to dehydration by the use of vacuum and a heating medium, the temperature of the heating medium being initially maintained at about 150–212° F., until the temperature of the cherries approaches a temperature of about 140–150° F. and then decreasing the temperature of the heating medium and maintaining it at about 140–150° F. until the dehydration is completed and thereafter packaging the dehydrated product in a non-oxygenous atmosphere.

2. A process for preparing dehydrated cherries which comprises sulphiting pitted cherries, freezing the sulphited cherries to produce individual discrete frozen cherries, subjecting the resulting material in the form of individual, frozen, discrete cherries to dehydration by the use of vacuum and a heating medium, the temperature of the heating medium being so regulated that the cherries are maintained in the frozen state only long enough to attain a liquid-retentive, volume-stable condition corresponding to a moisture content of about 50 to 60% and are thereafter brought to and maintained at a temperature of about 140–150° F. whereby to obtain rapid elimination of moisture without damage to the quality of the fruit.

References Cited in the file of this patent

UNITED STATES PATENTS

| | | |
|---|---|---|
| 2,182,556 | Griswold | Dec. 5, 1939 |
| 2,333,850 | Dunkley | Nov. 9, 1943 |
| 2,467,318 | Kellogg | Apr. 12, 1949 |
| 2,577,704 | Flosdorf | Dec. 4, 1951 |
| 2,765,236 | Blaine | Oct. 2, 1956 |
| 2,788,281 | Guadagni | Apr. 9, 1957 |

OTHER REFERENCES

"Food Industries," January 1945, pages 92–95, 98, 100, 102, 104, 106, 108.